Patented Aug. 31, 1943

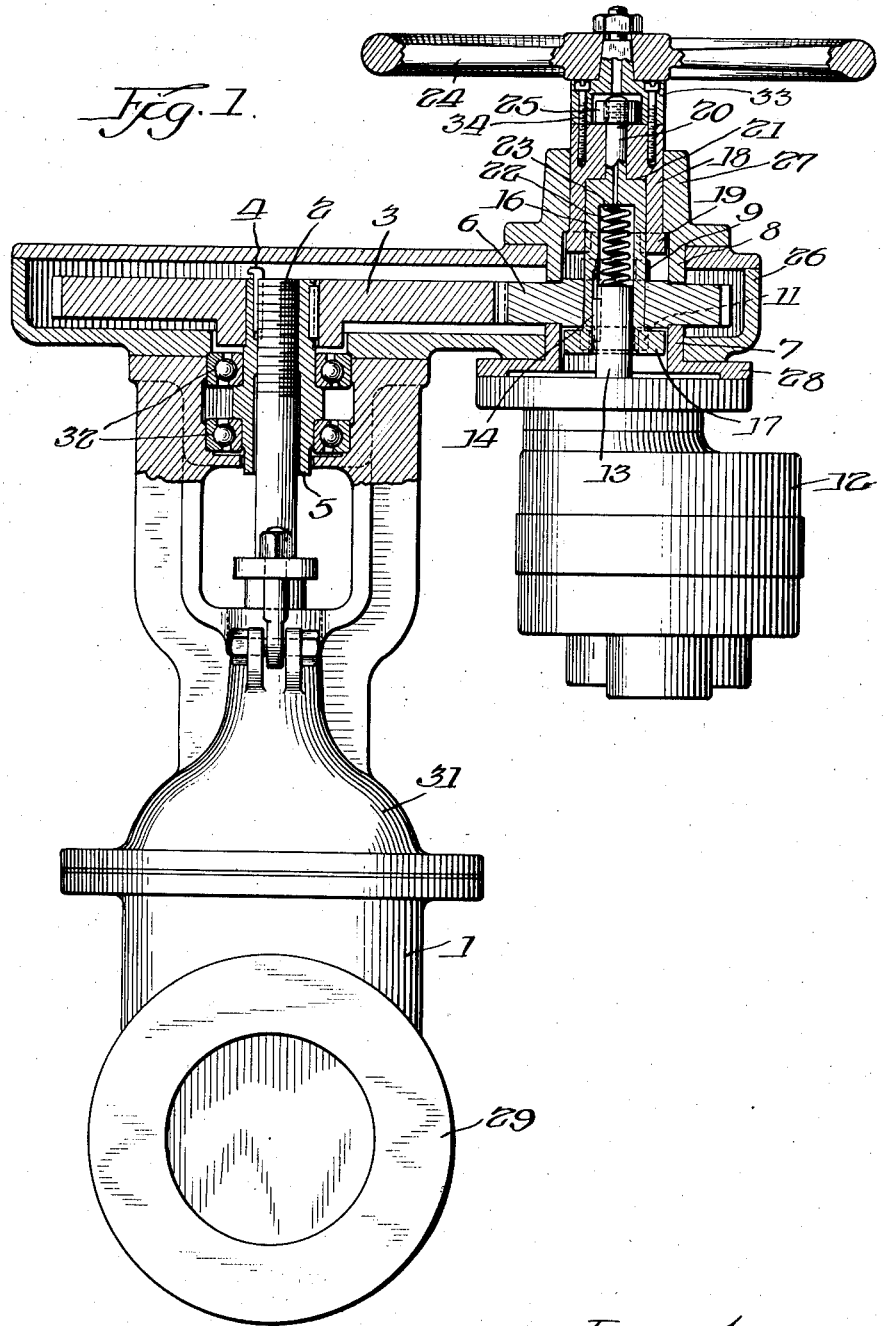

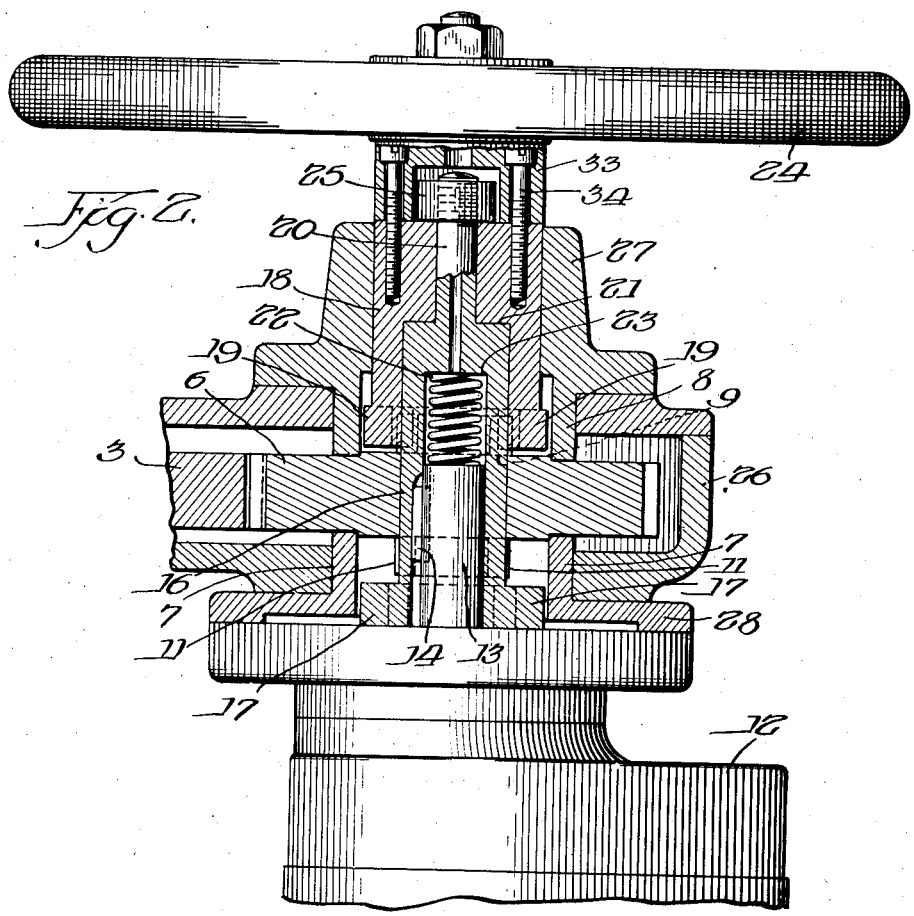

2,327,980

UNITED STATES PATENT OFFICE 2,327,980

AUTOMATIC DECLUTCHING MEANS

Corwin W. Bryant, Downers Grove, Ill., assignor to Crane Co., Chicago, Ill., a corporation of Illinois Application December 22, 1941, Serial No. 423,883

9 Claims. (Cl. 192—48)

This invention relates to a new and improved automatic declutching means for use with motor and hand operated valves and the like. It has for one of its principal objects the provision in combination with a motor normally engaging a valve to be operated an automatic means for disengaging the motor upon engagement of the hand actuator such as the conventional handwheel.

More specifically, an important object of this invention is the provision of a novel arrangement of gearing for driving a valve having combined motor and hand operating means therefor with clutches on the gear and motor respectively which constantly engage until such time as the handwheel and the integral clutch provided is manually moved into engagement with a further clutch on the gear. The latter operation automatically disengages the motor until the manual pressure on the handwheel is released whereupon the motor automatically again becomes engaged to the valve operating gearing.

Another important object of this invention is the provision of a novel actuating means featuring a floating gear selectively operated by either the motor or the handwheel and in which means the engagement of one gear automatically disengages the other.

Another and still further important object of this invention is to provide a motor operated valve means capable of being operated by hand simply and without the additional effort ordinarily caused by the turning of the motor by the handwheel in present valves, because in this instance the means of operation not in use is immediately disengaged permitting the actuating means to operate freely without being hampered by the non-actuating operation means.

The primary purpose of the construction generally described above is to insure greater safety. Heretofore it has been possible for serious accidents to occur due to the fact that in many cases a switch was innocently thrown from a remote point, causing motor operation of the valve to occur while the valve at the same time was being operated manually. The result in most cases was the incurrence of injury to the manual operator generally arising from being bodily thrown by the increased rotation of the handwheel under the influence of remote operation.

Other and further important objects of this invention will become apparent from the disclosures made in the following specification and accompanying drawings, in which Fig. 1 is a vertical sectional assembly view of the dual valve operating means embodying my invention and applied to a conventional valve, and with the motor in engagement.

Fig. 2 is a similar fragmentary sectional assembly view showing the manual means of operation in engagement, and with the motor disengaged.

Fig. 3 is a plan view of the clutch lug arrangement of the external sleeve.

Fig. 4 is a plan view of the clutch lug arrangement of the pinion gear.

Fig. 5 is a plan view of the clutch lug arrangement of the inner sleeve.

Referring to Fig. 1, the reference numeral 1 generally indicates a conventional valve body having the customary end flanges 29 suitable for connection to a pipe line. Attached by means of bolts (not shown) the valve body is provided with the bonnet 31. At the upper portion of the latter structure, the yoke sleeve 5 and the bearings 32 are assembled with the operating stem 2 non-rotatably held to the yoke sleeve 5 by means of the key 4, the assembled valve being known as the non-rising stem type of valve. However, the particular type of valve selected is not significant in relation to the application of this invention. A valve of the rising stem type may also be used, in which case the stem is not rotated, but allows for the usual rising stem by rotation of the yoke sleeve 5, in which case the driven gear 3 is keyed to the yoke sleeve 5.

In the usual installation requiring both motor and manual operation, it is desirable to operate the pinion 6 by either the motor or a handwheel in order that operation of the valve may be manually performed at the situs of the valve, or if the motor should fail for some unknown reason it is imperative that hand operation also be conveniently available. It is, however, not desirable to have the motor turn the handwheel when in operation or, contrarily, to have the handwheel turn the motor when it is operating the valve. It is the purpose of my invention to have the motor shaft 13 normally engage the pinion gear 6 to effect rotation of the gear 3 and resultant operation of the valve 1. The pinion gear 6 is journaled within the annular bearings 7 and 8. On either side of the gear 6 the preferably unitary clutch jaws 9 and 11 are positioned. Operation of the motor or prime mover 12 causes a rotation of the shaft 13 which has the inner sleeve 16 slidably keyed thereto as at 14. A complementary clutch 17 is preferably a unitary part of the inner sleeve 16, as is the guiding stud 20 with its end nut 25, the latter member serving as the means for assembling the respective inner and outer sleeves.

As shown in Fig. 1, the clutch jaws 11 and 17 are assembled in operative engagement. Thus when the shaft 13 rotates it rotates the inner sleeve 16 similarly and because the clutch jaws 11 and 17 are engaged the gear 6 rotates and in turn rotates the gear 3 which operates to raise or lower the closure member (not shown) in the valve casing 1.

Superposing the inner sleeve 16, the outer sleeve 18 is positioned having at its lower end portion the clutch 19. The respective sleeves 16 and 18 rotate independently of each other, but are movable axially together. The latter movement is obtained by means of the shoulder 21 on the outer sleeve 18, with the spring 22 acting on the shoulder 23 near the upper end of the sleeve 16, with the end nut 25 applied to the stud 20 for assembly of the sleeves. The coiled spring 22 positioned between the end of the motor shaft 13 and the inner sleeve shoulder 23 acts to urge the inner sleeve 16 upwardly and maintain the clutches 11 and 17 in operative engagement.

As better shown in Fig. 2, the handwheel or other manual operating means 24 is fixedly attached to the external sleeve 18 by means of the adapter member 33 and the attaching studs 34. Upon rotation of the hand-wheel 24 similar rotation of the external sleeve 18 is effected. It is thus apparent that mere rotation alone of the handwheel 24 will not operate the valve 1 nor will it disengage the clutch 11—17. It is necessary to move the handwheel 24 axially thereby moving the external sleeve 18 downward and causing an engagement of the clutch 19—9 and a disengagement or separation of the clutch jaws 11 and 17. Rotation of the handwheel 24 after such preliminary axial movement causes a similar rotation of the sleeve 18 and an operative engagement with the gear 6 by means of the clutch 19—9. The rotation of the pinion gear 6 effects a rotation of the gear 3 and with it the resultant operation of the valve 1. The pinion gear 6 is provided with a housing 26 which has mounted thereover the handwheel yoke sleeve hub 27. Depending from the yoke sleeve hub 27 is the annular bearing 8 adapted to provide journaling means for the pinion gear 6 in cooperation with the bearing 7 projecting upwardly from the cap-like element 28, which is mounted over the upper end portion of the motor 12 and around the shaft 13. Obviously the bearings 7 and 8 may be replaced with any type of bearings such as ball or roller bearings, if desired.

Thus with the construction described, if the motor is operated at some remote control station from the valve 1, the motor is normally in engagement with the pinion gear 6 if no attempt is being made to operate the valve by hand. It will be apparent that the spring 22 lifts the sleeves 16 and 18 to their highest position and thereby automatically engages the clutch 11—17 and disengages the clutch 9—19. In valves of this type wherein motor and hand actuating means are supplied it is possible to leave the handwheel engaged, making it impossible to operate the valve by motor at a remote position until such time as a clutch lever or the like has been moved at the site of the valve. In this proposed construction there is never any danger of the motor being disengaged from the valve and therefore it can be operated at the remote control station at all times regardless of which actuating means had been used immediately prior thereto.

It is clear that numerous changes may be made and the particular details of the construction varied throughout a wide range without departing from the principles disclosed herein. It is desired therefore not to limit the claims appended hereto otherwise than as necessitated by the prior art.

I claim:

1. Valve actuating means having a dual operating mechanism comprising a prime mover and a shaft therefor, a hand actuator, a gear having clutch means on opposite faces thereof, a pair of sleeves telescopically movable relative to each other and rotatable independently of each other, one of said sleeves being rotated by the said prime mover and having a clutch surface thereon suitable for engagement with one of the clutch means on the said gear, the other of said sleeves cooperating with the said hand actuator and having a clutch surface thereon for engagement with the other of said clutch means on the said gear, resilient means jointly maintaining the clutch surface on one of the sleeves in engagement with the clutch means on said gear and for normally retaining the clutch surface on the other of said sleeves out of engagement with the clutch means on said gear.

2. A selective clutch mechanism of the character described, operating means therefor comprising a motor, driven means cooperating therewith, manual operating means, a gear between the said motor and the said manual operating means, a pair of axially aligned sleeves between the said motor and the said manual operating means and one of said sleeves cooperating to interlockably engage the said driven means cooperating with the said motor, the other of said sleeves cooperating to interlockably engage with the manual operating means, and means for selectively and positively engaging either of said sleeves with the said gear to effect either manual or motor operation.

3. In an actuating mechanism comprising, in combination, a prime mover, a shaft therefor, manual operating means, an intermediate member interposed between the said prime mover and the said manual operating means and adapted to be selectively engageable by either the prime mover shaft or the said manual operating means, a rotatable sleeve engaging the said prime mover shaft, a separate sleeve axially aligned therewith and cooperating with the said manual operating means, clutch means on each of the said sleeves for cooperative engagement with the said intermediate member, each of the said sleeves being relatively movable axially, whereby one clutch engages one portion of the intermediate member when the other of said clutch means is disengaged from the other portion of the said intermediate member to effect either manual or motor operation.

4. A valve operating mechanism comprising, in combination, a prime mover, a shaft therefor, manual operating means, a driven member interposed between the said prime mover and the said manual operating means and adapted to be selectively operated by either the prime mover shaft or the said manual operating means, an inner sleeve rotatably engaging the said prime mover shaft, a superposed outer sleeve cooperating with the said manual operating means, clutch means on each of the said sleeves for selective engagement with the said driven member, means for effecting predetermined axial movement of each of said sleeves simultaneously, whereby when one clutch engages the said driven member the other clutch is disengaged from the said driven member, the said means for effecting said movement of the said sleeves together comprising shoulder means on one of the said sleeves and means for maintaining each of the said sleeves immovable axially relative to the other.

5. A valve operating mechanism or the like comprising, in combination, a power driven shaft, manual operating means, an intermediate member adapted to be selectively engageable by either the said power driven shaft or the said manual operating means, an inner sleeve rotatably engaging the said power driven shaft, a superposed outer sleeve rotatably engaging the said manual operating means, clutch means on each of the said sleeves for cooperative engagement with the said intermediate member, means for moving the said sleeves axially together, whereby when one of said clutch means on said sleeves engages the intermediate member the other of said clutch means is disengaged from the intermediate member, an annular shoulder on the said outer sleeve suitable for engagement with an annular shoulder on the said inner sleeve, resilient means acting against the annular shoulder of the said inner sleeve to urge the said sleeves upwardly, whereby the said power driven shaft is normally in engagement with the said intermediate member.

6. A valve operating mechanism or the like comprising, in combination, a motor, a shaft therefor, manual operating means, an intermediate member adapted to be selectively operated by either the motor or the said manual operating means, an inner sleeve rotatably engaging the said motor shaft, a superposed outer sleeve rotatably engaging the said manual operating means, clutch means on each of said sleeves for cooperative engagement with the said intermediate member, means for moving the said sleeves axially simultaneously to provide that when one clutch means engages one portion of the said intermediate member the other clutch means is disengaged from the said intermediate member, the said outer sleeve having an annular shoulder, an annular shoulder on the said inner sleeve, resilient means moving upwardly against the annular shoulder of the said inner sleeve to normally urge the said sleeves upwardly, the said inner sleeve clutch means thereby normally engaging the said intermediate member, whereupon downward movement of the said manual operating means causes the inner sleeve and its clutch means to disengage the intermediate member and permits the clutch means associated with the outer sleeve to engage the said intermediate member.

7. A valve actuator or the like comprising a shaft to be rotatably actuated, a driven gear keyed to the said shaft, a driving gear engaging the driven gear, selective means for operating the said driving gear, the said selective means including a motor, a shaft therefor, and manual operating means, an inner sleeve on the said motor shaft, a telescoping outer sleeve cooperating with the said manual operating means and adapted to move axially with the said inner sleeve and to rotate independently thereof, an internal annular shoulder on the outer of said sleeves for support of the said inner sleeve, the said inner sleeve having an internal annular shoulder, resilient means for normally maintaining the shoulder of the said inner sleeve against an inner portion of the said outer sleeve, clutch means on each side of said driving gear, clutch means associated with each of the said sleeves, whereby one of the said sleeves normally engages only one of the said clutches of said driving gear to thereby provide that when manual operation is being effected disengagement of motor operation occurs.

8. Valve actuating means comprising a rod to be actuated, a gear arranged to effect rotation of the said rod, a pinion gear engaging the first-named gear, dual means for operating the said pinion gear, the said dual means comprising a motor, a shaft therefor, manual operating means, a sleeve associated with the said motor shaft, a separate sleeve associated with the said manual operating means cooperating with the first of said sleeves, means on one of the said sleeves for the support of the other of said sleeves, resilient means positioned between the said motor shaft and one of the said sleeves, clutch means on each side of said pinion gear, a clutch therefor associated with each of the said sleeves, the said resilient means normally impelling the said sleeves upwardly, one of the sleeve clutch means normally engaging one of said clutch means on the said pinion gear, whereby a depressing movement of the manual means effects engagement of one of the sleeve clutches with one of the clutch means of said pinion gear and simultaneous disengagement of the other of the sleeve clutch means from the other of the said clutch means of the said pinion gear.

9. A selective clutch mechanism of the character described, operating means therefor comprising a motor, driven means cooperating therewith, manual operating means for effecting rotation in either clockwise or counter-clockwise directions, a gear positioned between the said motor and the said manual operating means, a pair of axially aligned sleeves located between the said motor and the said manual operating means, one of said sleeves cooperating with the said motor, the other of said sleeves cooperating with the manual operating means, and means for selectively engaging either of said sleeves with the said gear to effect either manual or motor operation.

CORWIN W. BRYANT.